United States Patent
Okamura et al.

(10) Patent No.: US 8,082,073 B2
(45) Date of Patent: Dec. 20, 2011

(54) ELECTRIC VEHICLE CONTROL DEVICE (75) Inventors: Masaki Okamura, Toyota (JP); Masayoshi Suhama, Toyota (JP); Ken Iwatsuki, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 617 days.

(21) Appl. No.: 12/227,717

(22) PCT Filed: Jan. 23, 2008

(86) PCT No.: PCT/JP2008/051330
§ 371 (c)(1),
(2), (4) Date: Nov. 25, 2008

(87) PCT Pub. No.: WO2008/093687
PCT Pub. Date: Aug. 7, 2008

(65) Prior Publication Data
US 2009/0248229 A1    Oct. 1, 2009

(30) Foreign Application Priority Data

Feb. 1, 2007    (JP) .................................. 2007-022589

(51) Int. Cl.
*G06F 17/00* (2006.01)
(52) U.S. Cl. ............................. 701/22; 477/2; 180/65.21
(58) Field of Classification Search ............... 701/22, 701/29, 36, 101; 180/65.21, 65, 265, 65.275, 180/65.245, 65.25; 477/2
See application file for complete search history.

(56) References Cited

U.S. PATENT DOCUMENTS 7,280,895 B2 * 10/2007 Mabuchi et al. .................. 701/1
2006/0036357 A1    2/2006 Isono et al.

FOREIGN PATENT DOCUMENTS

| CN | 1391339 A | 1/2003 |
|---|---|---|
| JP | A-10-225058 | 8/1998 |
| JP | A-10-243682 | 9/1998 |
| JP | A-10-248106 | 9/1998 |
| JP | A-11-187669 | 7/1999 |
| JP | A-2004-106663 | 4/2004 |
| JP | A-2004-208409 | 7/2004 |
| JP | A-2006-144641 | 6/2006 |
| JP | A-2006-151039 | 6/2006 |
| JP | A-2006-345677 | 12/2006 |

OTHER PUBLICATIONS

Chinese Office Action issued in Chinese Application No. 200880001313.1 on Oct. 27, 2010 (with translation).

* cited by examiner

*Primary Examiner* — Richard Camby
(74) *Attorney, Agent, or Firm* — Oliff & Berridge, PLC (57) ABSTRACT

A loss reduction module of an electric vehicle control device has a function to limit a torque to not exceed a constant loss characteristic and issue a torque instruction if a requested torque exceeds the constant loss characteristic when an ecology switch is turned ON and low fuel consumption travel is instructed. More specifically, when a requested torque exceeding the constant loss characteristic is input, a torque limit is applied to a point on the constant loss characteristic. Accordingly, the torque instruction is output as a torque which is suppressed more than a characteristic curve obtained by combining the constant loss characteristic and a characteristic indicating the relationship between the torque and the number of rotations during normal travel.

5 Claims, 6 Drawing Sheets

ELECTRIC VEHICLE CONTROL DEVICE

TECHNICAL FIELD

The present invention relates to a control device of an electric vehicle, and, more particularly, to a control device of an electric vehicle which has a low-fuel-consumption instruction acquisition unit which acquires a low-fuel-consumption travel instruction from a user.

BACKGROUND ART

In recent years, electric vehicles such as electric automobiles, hybrid vehicles, and fuel cell automobiles which are environmentally friendly have attracted much attention. From the viewpoint of being environmentally friendly, it is desirable to improve energy efficiency, such as improvement of fuel consumption. However, improved fuel consumption may come at the sacrifice of vehicle maneuverability, cabin comfort, etc., in such forms as a limitation of power performance of the vehicle and a limitation on air-conditioning. Therefore, it is desirable to select the energy efficient configuration by a simple operation of a driver. For this purpose, a switch or the like for instructing low-fuel-consumption travel is provided in a controlling unit of the vehicle. Such a switch is often called, for example, an "ecology-mode switch" or an "ecology switch."

For example, JP Hei 10-248106 A discloses a control device of an electric automobile wherein a mode of a running motor is switched between a normal mode and an ecology mode by operation of a mode selection switch, a high power of 100% is achieved in the normal mode and a low power of 60% is achieved in the ecology mode, and during travel at low power the output is gradually increased to 90% on an uphill road or the like in which the power is insufficient.

In this manner, it is possible to provide a switch to issue the low-fuel-consumption travel instruction and achieve travel with reduced fuel consumption by selection of the driver. In the example of JP Hei 10-248106 A, in the ecology mode, the power is set to the low power of 60% and the output limitation is imposed in order to reduce fuel consumption. An electric vehicle is provided with, for example, a battery, a driving circuit such as a voltage boosting circuit and an inverter circuit, and a dynamo-electric machine for driving and regeneration or the like. Even when the power limitation is imposed, the fuel consumption may fail to be improved if losses in these structures are increased.

An object of the present invention is to provide a control device of an electric vehicle which allows execution of control which improves fuel consumption upon issuance of a low-fuel-consumption travel instruction.

DISCLOSURE OF THE INVENTION

According to one aspect of the present invention, there is provided a control device of an electric vehicle, the control device comprising a driving unit having a dynamo-electric machine and a power supply device which is connected to the dynamo-electric machine, and a controlling unit which controls the driving unit, wherein the controlling unit comprises a low-fuel-consumption instruction acquisition unit which acquires a low-fuel-consumption travel instruction from a user, a storage unit which stores loss characteristics which are relationships among a torque of the dynamo-electric machine, a number of rotations, and a loss of the driving unit, and a loss-reducing unit which refers to the loss characteristics and executes a control to reduce the loss of the driving unit by reference to a requested torque when the low-fuel-consumption travel instruction is acquired.

According to another aspect of the present invention, preferably, in the control device of electric vehicle, the loss-reducing unit refers to the loss characteristics and executes a torque limitation on a constant loss characteristic in which loss of the driving unit is constant, during a transition from normal travel to low-fuel-consumption travel.

According to another aspect of the present invention, preferably, in the control device of electric vehicle, the loss-reducing unit refers to the loss characteristics and outputs a torque instruction so that the torque is on a constant efficiency characteristic in which efficiency of the driving unit is constant.

According to another aspect of the present invention, preferably, in the control device of electric vehicle, the loss-reducing unit refers to the loss characteristics and reduces a voltage-boosting ratio of a power supply device during the low-fuel-consumption travel from that employed during normal travel, according to a vehicle travel state.

According to another aspect of the present invention, preferably, in the control device of electric vehicle, the loss characteristics are referred to and the voltage-boosting ratio is set on the basis of a copper loss due to a current which cancels a counter electromotive force and a voltage boosting loss of the power supply device and according to the vehicle travel state.

According to another aspect of the present invention, it is also possible to arbitrarily combine the above-described configurations of the loss-reducing unit in the control device of electric vehicle, including execution of torque limitation while the loss of the driving unit is on the constant loss characteristic, execution of the torque limitation so that the torque is on the constant efficiency characteristic, the control of the voltage-boosting ratio of the power supply device, and the determination of the voltage-boosting ratio on the basis of the copper loss and voltage-boosting loss.

According to various aspects of the present invention, in the control device of electric vehicle, the loss reduction of the driving unit is executed when the low-fuel-consumption travel instruction is issued, and, thus, control to improve the fuel consumption can be executed.

EXPLANATIONS OF REFERENCE NUMERALS

10 CONTROL DEVICE OF ELECTRIC VEHICLE
20 DRIVING UNIT
22 MOTOR/GENERATOR
24 POWER SUPPLY DEVICE
26 ELECTRICITY STORAGE DEVICE
28,34 AVERAGING CAPACITOR
30 VOLTAGE CONVERTER
32 REACTOR
36 INVERTER CIRCUIT
40 CONTROLLING UNIT
42 CPU
44 STORAGE DEVICE
46 REQUESTED TORQUE
48 ECOLOGY SWITCH
50 LOW-FUEL-CONSUMPTION TRAVEL INSTRUCTION ACQUISITION MODULE
52 LOSS-REDUCING MODULE
60 T-N CHARACTERISTIC
62 CONSTANT TORQUE
64 LIMITED NUMBER OF ROTATIONS
70 CONSTANT LOSS CHARACTERISTIC
72, 78, 64 CHARACTERISTIC CURVE
74 OPERATION POINT
76 CONSTANT EFFICIENCY CHARACTERISTIC
80 LOW VOLTAGE T-N CHARACTERISTIC
82 BOUNDARY

BEST MODE FOR CARRYING OUT THE INVENTION

A preferred embodiment of the present invention will now be described in detail with reference to the drawings. In the following description, a hybrid vehicle having an electricity storage device and an engine will be described as an electric vehicle. Alternatively, the electric vehicle may be an electric automobile which does not have an engine, or a fuel cell automobile which has a fuel cell serving as a power supply. In addition, in the following description, a vehicle having a motor/generator which uses the motor also as a generator will be described. Alternatively, the vehicle may have a separate motor and generator, and may generally be a vehicle having a dynamo-electric machine and a power supply circuit which is connected to the dynamo-electric machine. The number of dynamo-electric machines is not limited to one, and, for example, the vehicle may have two dynamo-electric machines.

Figure 1:
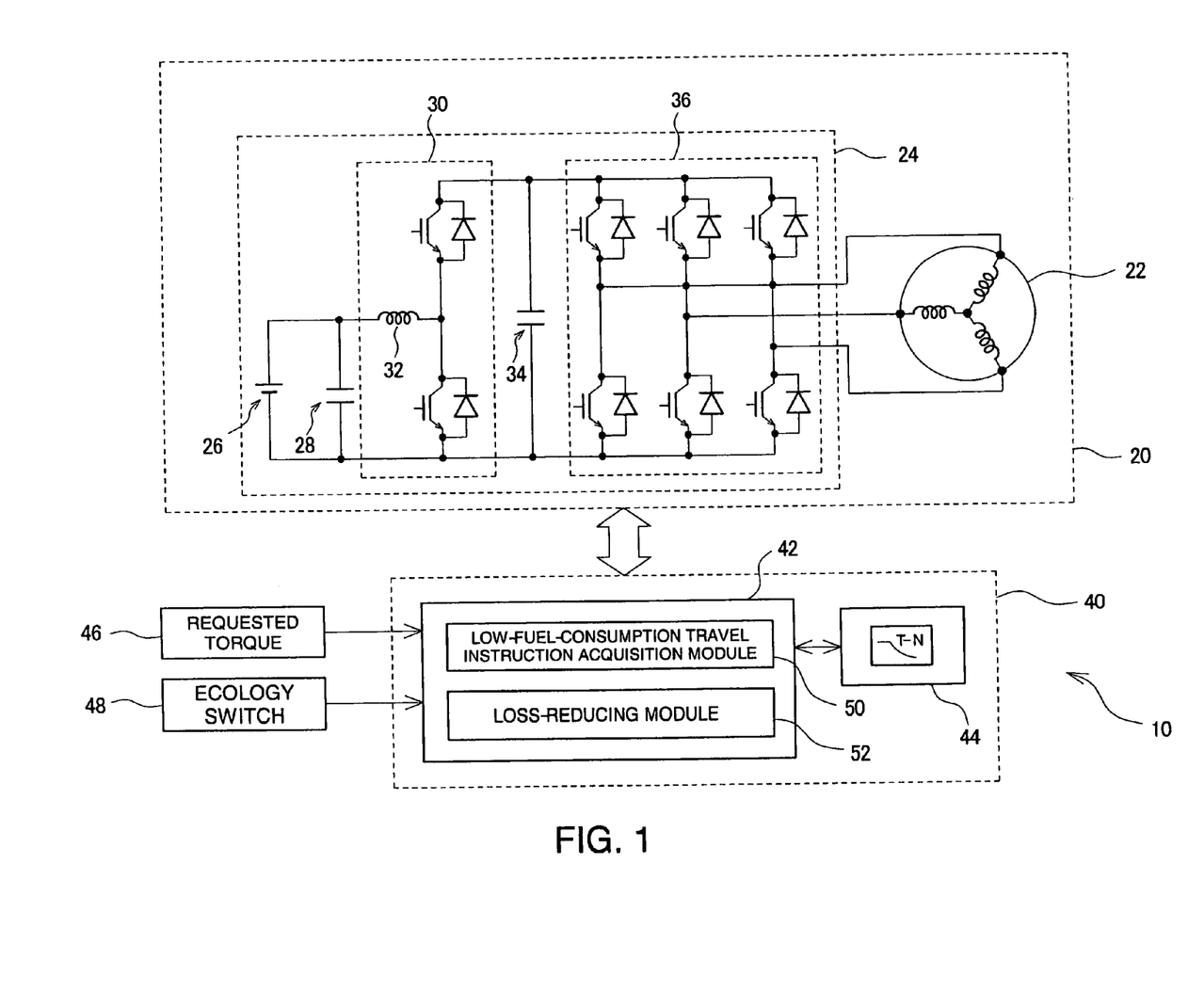
FIG. 1 is a diagram showing a structure of a control device of an electric vehicle of a preferred embodiment of the present invention.

FIG. 1 is a diagram showing a structure of a control device of a portion of the motor/generator in a hybrid vehicle having an engine and a motor/generator. A control device 10 of electric vehicle comprises a driving unit 20 and a controlling unit 40. The driving unit 20 comprises a motor/generator 22 and a power supply device 24 which is connected to the motor/generator 22. The controlling unit 40 comprises a CPU 42 and a data storage device 44 (hereinafter, referred to as storage device 44) which stores loss characteristics or the like which will be described later.

As described above, the driving unit 20 comprises the motor/generator 22 which functions as a driving motor during exertion of the vehicle and as a generator during braking of the vehicle, and the power supply device 24 which supplies power to the motor/generator 22 when the motor/generator 22 functions as the driving motor and receives regeneration power from the motor/generator 22 and charges an electricity storage device when the motor/generator 22 functions as the generator.

The power supply device 24 comprises an electricity storage device 26 which is a secondary battery, an averaging capacitor 28 on a side of the electricity storage device, a voltage converter 30 having a reactor 32, an averaging capacitor 34 on a voltage-boosting side, and an inverter circuit 36.

As the electricity storage device 26 there may be used, for example, a lithium ion battery pack or a nickel hydrogen battery pack having a terminal voltage of approximately 200 V to 300 V or a capacitor or the like.

The voltage converter 30 is a circuit having a function to boost the voltage on the side of the electricity storage device 26 to, for example, approximately 600 V, by means of an energy-accumulating action of the reactor 32. The voltage converter 30 has a bi-directional function, and also has a function, when power from the side of the inverter circuit 36 is supplied to the side of the electricity storage device 26 as charging power, to reduce the high voltage on the side of the inverter circuit 36 to a voltage suitable for the electricity storage device 26.

The inverter circuit 36 is a circuit having a function to convert a high-voltage direct current power to an alternating current three-phase driving power and supply the converted power to the motor/generator 22 and a function to convert the alternating current three-phase regeneration power from the motor/generator 22 to the high-voltage direct current charging power.

The controlling unit 40 has a function to receive an instruction from an unillustrated vehicle-controlling unit and to control operations of the constituent elements of the driving unit 20. Here, in particular, the controlling unit 40 has a function to send, to the driving unit 20, a torque instruction or the like which realizes low fuel consumption in accordance with a requested torque 46 when an ecology switch 48 is switched ON.

The ecology switch 48 is an operational control which can be arbitrarily operated by the user, and is a switch which has a function to output a low-fuel-consumption travel instruction signal which indicates that the user desires low-fuel-consumption travel, when the switch is switched ON. The ecology switch 48 may be provided, for example, at a suitable position in the driver's seat.

The requested torque 46 is an instruction signal which is output from the unillustrated vehicle-controlling unit, and is, for example, an information signal which tells the motor/generator 22 the content of the requested torque by reference to the states of an acceleration pedal, a braking pedal, a shifting device, etc. The content of the requested torque 46 includes a sign for distinguishing the torque as an exertion torque; that is, a torque for driving the vehicle, or as a regeneration torque; that is, a torque for breaking the vehicle, and a torque amount which indicates the quantity of the torque. In the following description, a requested torque with a positive sign; that is, a torque which is a driving torque for exertion of the vehicle, will be described.

The controlling unit 40 comprises the CPU 42 and the storage device 44. As described above, the controller 40 has a function to control operations of the constituent elements while monitoring the states of the constituent elements of the driving unit 20. Monitoring of the states of the constituent elements of the driving unit 20 includes, for example, a number N of rotations of the motor/generator 22, a terminal voltage and output current of the electricity storage device 26, an output torque of the motor/generator 22, etc. These state signals are input to the controlling unit 40. The controlling unit 40 may be constructed using a computer suitable for being equipped in a vehicle. The controlling unit 40 may be formed as an independent computer, or the functions of the controlling unit 40 may be included in the functions of the other computers equipped in the vehicle. For example, when the vehicle is equipped with an overall controlling unit which controls the entire vehicle or a hybrid CPU or the like, the function of the controlling unit 40 may be included as a part of these functions.

The CPU 42 has functions for general control of the driving unit 20; that is, functions to operate the voltage converter 30 according to the requested torque 46, control the inverter circuit 36 to cause generation of a suitable alternating current three-phase driving signal, and supply the signal to the motor/generator 22. Here, in particular, the CPU 42 comprises a low-fuel-consumption travel instruction acquisition module 50 which acquires an ON/OFF state of the ecology switch 48 and a loss-reducing module 52 which outputs, when the ecology switch 48 is determined to be in the ON state, a torque instruction which is suppressed as compared to the torque instruction when the ecology switch 48 is in the OFF state while reducing the loss of the driving unit 20. These functions are realized by execution of software. More particularly, these functions are realized by execution of a corresponding electric vehicle control program. Alternatively, it is also possible to realize a part of the functions with hardware.

The storage device 44 has a function to store, in addition to a control program or the like necessary for operation of the controlling unit 40, particularly in this configuration, maps or the like related to the loss characteristics of the driving unit 20. The maps or the like related to the loss characteristics are a three-dimensional map indicating a relationship between a torque T and a number N of rotations of the dynamo-electric machine, in relation to the loss. The loss includes the conversion efficiency and loss characteristic of the voltage converter 30, the loss characteristic of the inverter circuit 36, electric and mechanical conversion efficiency, and loss characteristic such as copper loss of the motor/generator 22. The conversion efficiency or the like of the voltage converter 30 and the inverter circuit 36 includes, for example, the loss characteristic or the like due to an operation frequency.

Here, the map or the like widely includes structures having a function to receive input of the torque T and the number N of rotations and outputs the loss, and includes, in addition to the conversion map and a lookup table, a formula or the like.

Figure 2:
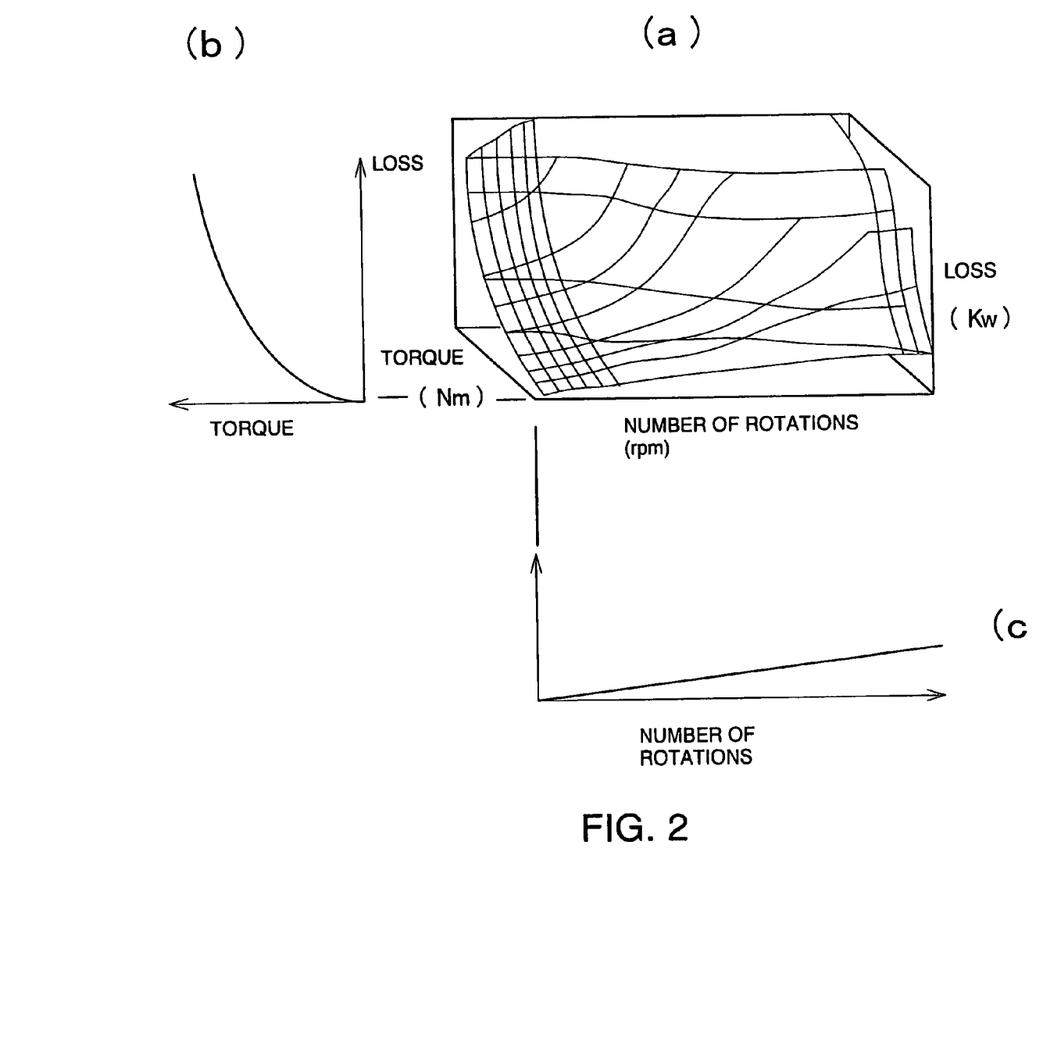
FIG. 2 is a diagram showing an example of a representative loss characteristic map in a preferred embodiment of the present invention.

FIG. 2 is a diagram showing an example of a representative loss characteristic map. In (a) at the center of FIG. 2, a three-dimensional map in which the loss is added to the two-dimensional display of the torque and the number of rotations is shown. The plan view in the three-dimensional map shows a relationship between the torque and the number of rotations, the side view shows a relationship between the torque and the loss, and the front view shows a relationship between the number of rotations and the loss.

In (b) at the left of FIG. 2, a diagram showing a relationship between the torque and the loss is shown, which corresponds to a side view of (a), which is the three-dimensional map at the center of FIG. 2. In general, when the loss of the driving unit 20 including the motor/generator 22 and the power supply device 24 is considered in view of the torque T of the motor/generator 22, the torque is proportional to the current of the motor/generator 22, and the loss of the motor/generator 22 can be represented as $I^2R$, with I representing the current and R representing the motor resistance. Therefore, the loss of the driving unit 20 can be considered to be proportional to a second power of the torque ($T^2$). In (b) at the left of FIG. 2, a diagram of the loss having a second-order characteristic is shown. Meanwhile, in (c) at the bottom of FIG. 2, a diagram showing a relationship between the number of rotations and the loss is shown, which corresponds to the front view of (a) which is the three-dimensional map at the center of FIG. 2. In general, the loss is proportional to the number of rotations.

Therefore, the basic loss characteristic, which is a relationship among the torque, number of rotations, and loss, is a characteristic in which a component which is proportional to a first power of the number of rotations (N) and a component which is proportional to a second power of the torque ($T^2$) are combined. A characteristic in which the conversion efficiency of the voltage converter 30, the conversion efficiency of the inverter circuit 36, etc. are superposed to the above mentioned basic loss characteristic is the total loss characteristic of the driving unit 20, and data of these various loss characteristics are stored in the storage device 44. As described above, the storage device 44 stores in an associated manner the amount of the basic loss, with the torque, the number of rotations, etc. of the motor/generator 22 serving as search keys. Alternatively, for example, the conversion efficiency and the amount of loss of the voltage converter can be stored in an associated manner with the voltage-boosting ratio of the voltage converter 30 serving as a search key, or the conversion efficiencies and loss of the voltage converter 30 and the inverter circuit 36 and the loss can be stored in an associated manner, with the operation frequencies of the voltage converter 30 and the inverter circuit 36 serving as search keys.

Operations of the control device 10 of electric vehicle having the above-described structure; in particular, several types of the functions of the loss-reducing module 52 in the CPU 42 of the controlling unit 40, will now be described in detail with reference to FIG. 3, etc. In the following description, the reference numerals of FIG. 1 are used.

Figure 3:
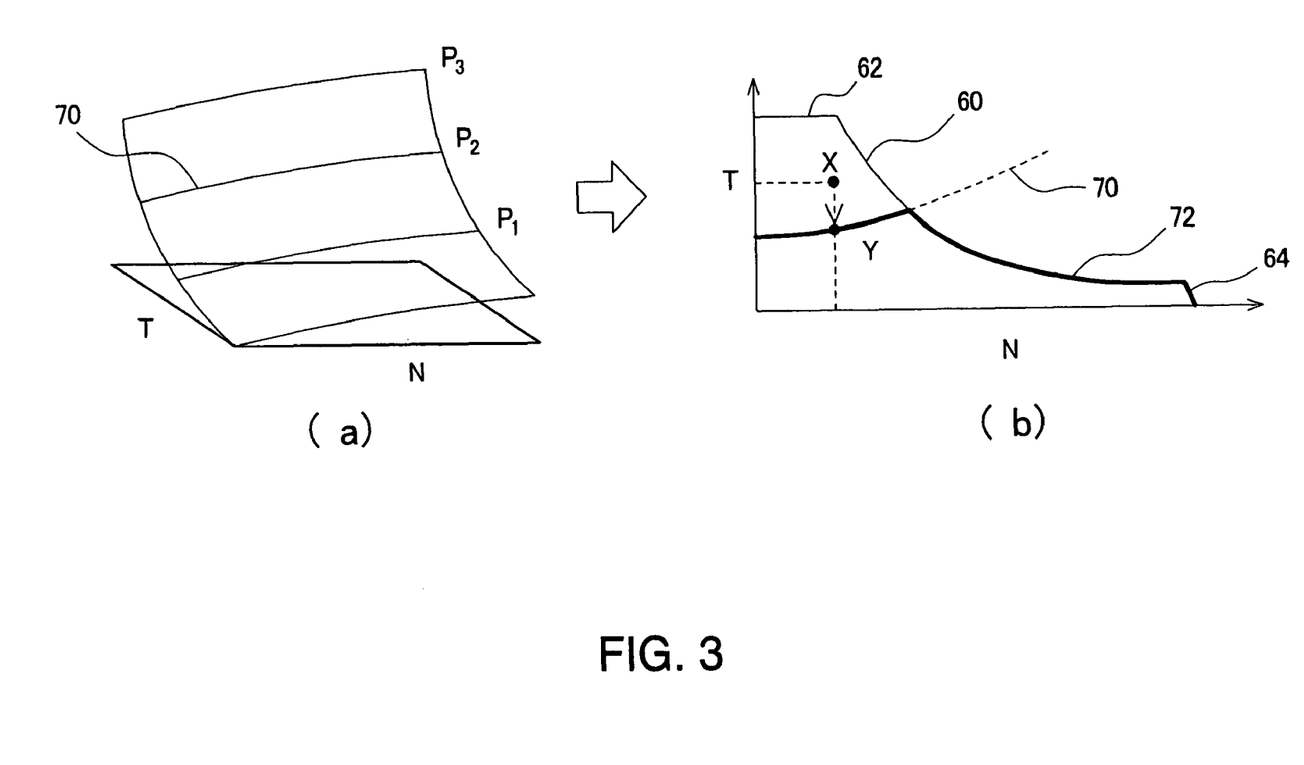
FIG. 3 is a diagram for explaining execution of a torque limitation on a constant loss characteristic in a preferred embodiment of the present invention.

FIG. 3 is a diagram for explaining a first function of the loss-reducing module 52. The first function of the loss-reducing module 52 is to refer to the loss characteristics and execute a torque limitation on a constant loss characteristic in which the loss of the driving unit 20 is constant, during transition from normal travel to low-fuel-consumption travel. In (a) at the left of FIG. 3, a diagram of the constant loss characteristic is shown. As described above, because the loss characteristic of the driving unit 20 shows a second-order characteristic with respect to the torque T and a first-order characteristic with respect to the number N of rotations, when the loss amount is $P_1$, $P_2$, or $P_3$, the constant loss characteristic is three-dimensionally represented as shown in (a) at the left of FIG. 3. FIG. 3 shows, in (b) at the right, control of the driving unit 20 by the controlling unit 40 by applying a torque limitation according to the requested torque while maintaining the state of the constant loss, in order to prevent an increase in the loss amount.

In (b) at the right of FIG. 3, a T-N characteristic 60 related to the torque T and the number N of rotations of the motor/generator 22 and a constant loss characteristic 70 when the loss amount is set to $P_2$ are shown. The T-N characteristic 60 is a diagram showing a relationship between the torque T and the number N of rotations when the power is constant, based on a general relationship of power=T×N. In the region of high torque T, the torque is set to a constant torque 62 by a current limitation of the inverter circuit 36, and, in a region of high number N of rotations, the number N of rotations is set to a limited number of rotations 64 due to a limitation on the maximum speed of the vehicle. The constant loss characteristic 70 is shown as a projection, on the T-N plane, of the three-dimensional display of the loss $P_2$ explained with reference to (a) at the left of FIG. 3.

The loss-reducing module 52 has a function to execute a torque limitation so that the torque does not exceed the constant loss characteristic 70 when the ecology switch 48 is in the ON state and the requested torque 46 exceeds the constant loss characteristic 70, and to send a torque instruction. FIG. 3 shows, in (b) at the right, application of the torque limitation to a point Y on the constant loss characteristic 70 upon input of a requested torque X exceeding the constant loss characteristic 70. Therefore, the torque instruction is output as a torque which is suppressed as compared to a characteristic curve 72 in which the constant loss characteristic 70 and the T-N characteristic 60 are combined. In other words, the upper limit of the torque instruction is limited by the characteristic curve 72. The combined characteristic curve 72 is shown with a thick line in (b) at the right of FIG. 3.

More specifically, a determination is made as to whether or not the ecology switch 48 is in the ON state (ecology switch condition determining step); when the ecology switch 48 is in the ON state, a number N of rotations under the travel condition at that time is detected and acquired, and a requested torque 46 is acquired (requested torque acquisition step). In the above-described example configuration, the condition of the point X is acquired.

Then, an constant loss characteristic for low fuel consumption is set (constant loss characteristic setting step). In the above-described example configuration, the loss is set as $P_2$. In the storage device 44, the T-N characteristic of the motor/generator 22 and the constant loss characteristic corresponding to a search key of loss=$P_2$ are referred to and searched (constant loss characteristic searching step). In the above-described example configuration, the T-N characteristic 60 and the constant loss characteristic 70 are searched. Then, a determination is made as to whether or not the condition of the number N of rotations and the requested torque acquired in the required torque acquisition step is greater than the characteristic curve 72 in which the T-N characteristic 60 and the constant loss characteristic 70 are combined. When the condition is greater, the torque limitation is applied to the requested torque to reduce the torque value until the condition becomes a condition on the characteristic curve 72, and the limited torque value is output as the torque instruction (torque-limiting step). In the example configuration of FIG. 3, the torque is suppressed to the point Y on the characteristic curve 72, and the suppressed torque value is output as the torque instruction.

In this manner, during transition from normal travel to low-fuel-consumption travel, the loss characteristics are referred to and the torque limitation is executed on the constant loss characteristic 70 in which the loss of the driving unit 20 is constant.

Figure 4:
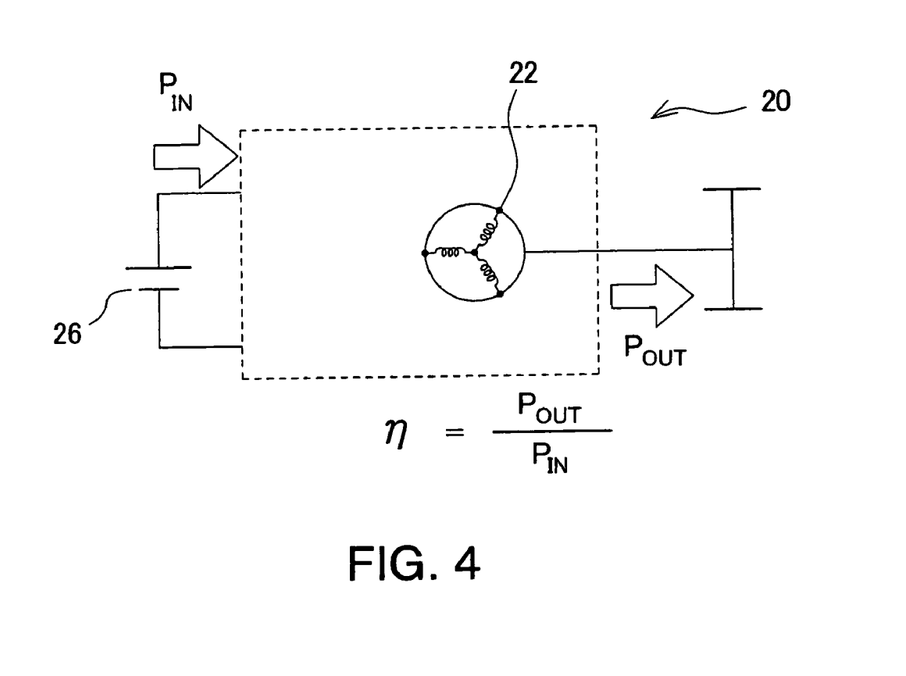
FIG. 4 is a diagram for explaining an efficiency of a driving unit in a preferred embodiment of the present invention.
Figure 5:
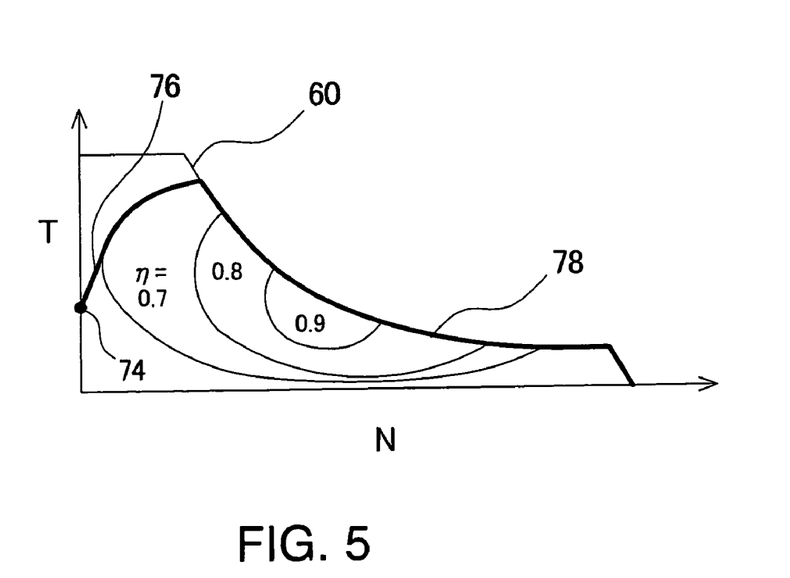
FIG. 5 is a diagram for explaining sending of a torque instruction so that the torque is on a constant efficiency characteristic in a preferred embodiment of the present invention.

FIGS. 4 and 5 are diagrams for explaining a second function of the loss-reducing module 52. The second function of the loss-reducing module 52 is a function to refer to the loss characteristics upon reception of the low-fuel-consumption travel instruction and output a torque instruction so that the torque is on a constant efficiency characteristic in which the efficiency of the driving unit 20 is constant. FIG. 4 is a diagram for explaining an efficiency η of the driving unit 20. The efficiency η of the driving unit 20 is determined by a ratio of the power $P_{OUT}$ which is output from the motor/generator 22 with respect to the power $P_{IN}$ which is output from the electricity storage device 26 to the voltage converter 30 or the like. In other words, the efficiency η of the driving unit 20=$P_{OUT}/P_{IN}$.

FIG. 5 is a diagram showing a constant efficiency curve in the motor/generator 22, and shows constant efficiency curves when η=0.7, 0.8, and 0.9, respectively. The constant efficiency curves can be determined through calculations in advance, once the structure of the driving unit 20 is determined. The calculated constant efficiency curves are stored in the storage device 44.

As shown in FIG. 5, the constant efficiency curve does not necessarily include the case of the number N of rotations of 0 (N=0). An operation point 74 when the number N of rotations is 0 is a torque which is determined on the basis of an uphill characteristic of the vehicle or the like. For example, even when the ecology switch 48 is switched ON in the vehicle and a torque instruction is to be sent to prevent reduction of the efficiency of the driving unit 20 to a value less than 0.7, the operation point 74 and the constant efficiency curve with η=0.7 are separate. Thus, as a connecting line therebetween, for example, a tangent line is drawn from the operation point 74 to the constant efficiency curve with η=0.7. A curve in which the connecting line and the constant efficiency curve with η=0.7 are combined is used as a constant efficiency characteristic 76 for torque limitation characteristic curve to output a torque instruction for low fuel consumption such that the efficiency is on the constant efficiency characteristic. Because such a constant efficiency characteristic 76 in which the operation point 74 with the number N of rotations of 0 and the constant efficiency curve are combined can be calculated and determined in advance, the constant efficiency characteristics 76 which are determined in advance are stored in the storage device 44 with the efficiency η serving as a search key.

In order to apply the torque limitation using the constant efficiency characteristic, the following process may be employed. First, a determination is made as to whether or not the ecology switch 48 is in the ON state (ecology switch condition determining step); when the ecology switch is in the ON state, the number N of rotations under the travel condition at that time is detected and acquired, and a requested torque 46 is acquired (requested torque acquisition step). The process up to this point is identical with that described with reference to FIG. 3.

Then, a constant efficiency characteristic for low fuel consumption is set (constant efficiency characteristic setting step). In the above-described example configuration, the efficiency is set to 0.7. In the storage device 44, the T-N characteristic of the motor/generator 22 and a constant efficiency characteristic corresponding to a search key of the efficiency η=0.7 are referred to and searched (constant efficiency characteristic searching step). In the above-described example configuration, the T-N characteristic 60 and the constant efficiency characteristic 76 for η=0.7 are searched. Then, a determination is made as to whether or not a condition of the number N of rotations and the requested torque acquired in the requested torque acquisition step is greater than a characteristic curve 78 in which the T-N characteristic 60 and the constant efficiency characteristic 76 are combined. When the condition is greater, a torque limitation is applied to reduce the torque value of the requested torque until a condition on the characteristic curve 78 is satisfied, and the limited torque value is output as the torque instruction (torque-limiting step). In other words, the upper limit of the torque instruction is limited by the characteristic curve 78. The combined characteristic curve 78 is shown in FIG. 5 with a thick line.

In this manner, during transition from normal travel to low-fuel-consumption travel, the loss characteristics are referred to, and the torque instruction is output such that the torque is on the constant efficiency characteristic 76 in which the efficiency of the driving unit 20 is constant.

Figure 6:
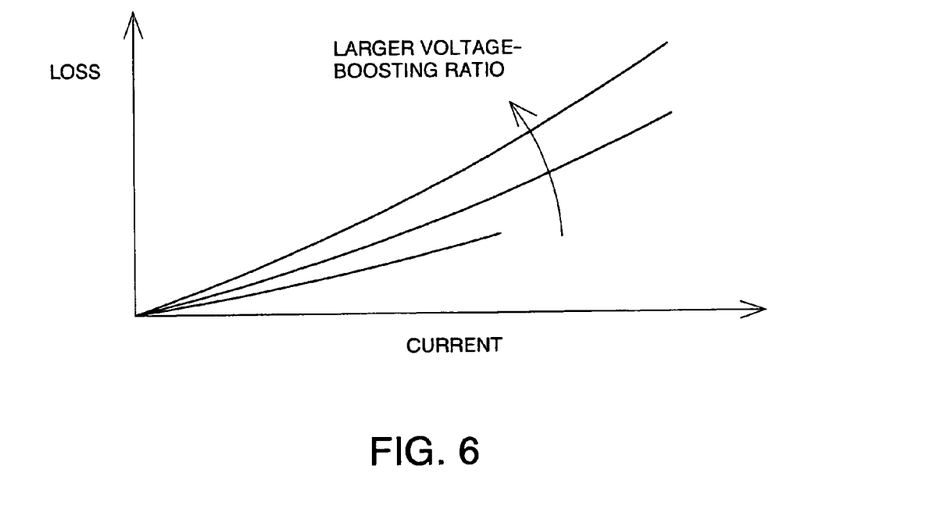
FIG. 6 is a diagram showing a relationship of a current and a voltage-boosting ratio with regard to the loss of the power supply device in a preferred embodiment of the present invention.
Figure 7:
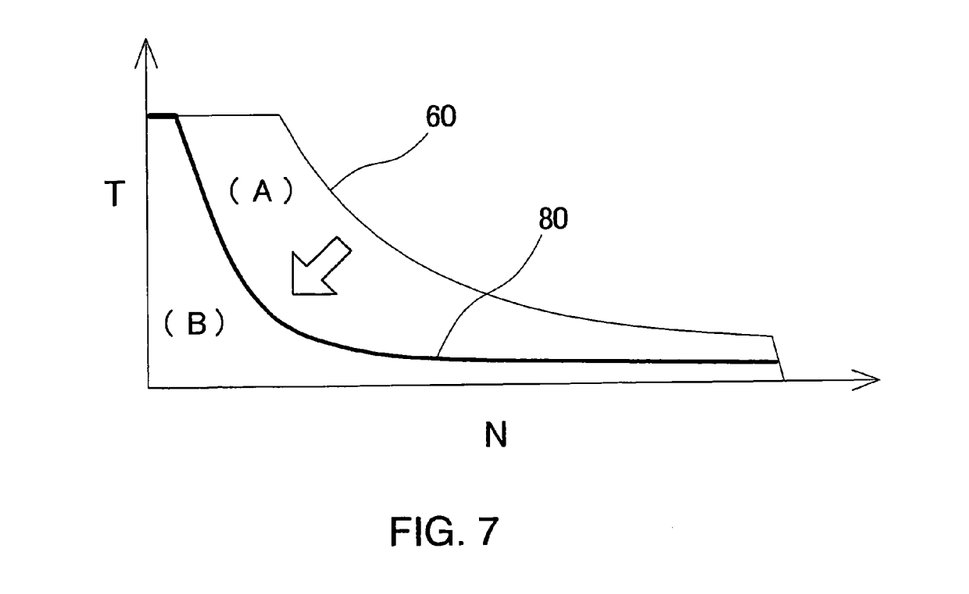
FIG. 7 is a diagram for explaining reduction of the voltage-boosting ratio of the power supply device from that employed in normal travel, according to a vehicle travel state, during low-fuel-consumption travel in a preferred embodiment of the present invention.

FIGS. 6 and 7 are diagrams for explaining a third function of the loss-reducing module 52. The third function of the loss-reducing module 52 is a function to refer to the loss characteristics and reduce a voltage-boosting ratio of the power supply device 24 as compared with that in normal travel, during low-fuel-consumption travel, according to the vehicle travel state. FIG. 6 is a diagram showing a relationship between the current and the voltage-boosting ratio with regard to the loss of the power supply device 24. As shown in FIG. 6, as the voltage-boosting ratio is increased, the loss is increased. Here, the voltage-boosting ratio is a ratio between an input voltage of the voltage converter 30 on the side of the electricity storage device 26 and an output voltage on the side of the inverter circuit 36. For example, when the input voltage on the side of the electricity storage device 26 is 300 V and the output voltage on the side of the inverter circuit 36 is 600 V, the voltage-boosting ratio is 2.

Because the loss is increased as the voltage-boosting ratio is increased as shown in FIG. 6, it is desirable for low fuel consumption that, when the ecology switch 48 is in the ON state, the voltage-boosting ratio is maintained at a minimum voltage-boosting ratio necessary for travel of the vehicle. For example, in the above-described example configuration, the voltage-boosting ratio can be suitably set between 1 and 2 and the loss can be suppressed. When the voltage boosting is not necessary, it is desirable that the voltage is not boosted; that is, the voltage-boosting ratio is set to 1, and the motor/generator 22 is driven by the power of the electricity storage device 26 without boosting, through the inverter circuit 36.

FIG. 7 is a diagram of such a process and shows the T-N characteristic 60 during normal travel and a low voltage T-N characteristic 80 when the vehicle travels in a state with the voltage of the electricity storage device 26 without voltage boosting. Because the T-N characteristics for different voltage-boosting ratios can be determined in advance through calculations, the determined T-N characteristics are stored in the storage device 44 with the voltage-boosting ratio or the boosted voltage serving as a search key. In the above-described example configuration, the T-N characteristic 60 during normal travel can be searched with the search key of voltage-boosting ratio=2 or boosted voltage=600 V, and the low voltage T-N characteristic 80 for low fuel consumption can be searched with the search key of voltage-boosting ratio=1 or boosted voltage=300 V. The low voltage T-N characteristic 80 is shown in FIG. 7 with a thick line.

For example, during normal travel, the torque limitation is applied with the T-N characteristic 60 under a high-voltage supply of 600 V in the above-described example configuration, and the torque instruction is output in the condition within the region shown as (A) in FIG. 7. When the ecology switch 48 is switched ON, on the other hand, the torque limitation is applied by the low voltage T-N characteristic 80 under low-voltage supply of 300 V in the above-described example configuration, and the torque instruction is output in the condition within a region shown as (B) in FIG. 7. In other words, the upper limit of the torque instruction is limited by the low voltage T-N characteristic 80.

In order to limit the torque through reduction of the voltage-boosting ratio, the following process may be employed. First, a determination is made as to whether or not the ecology switch 48 is in the ON state (ecology switch condition determining step); when the ecology switch 48 is in the ON state, a number N of rotations under the travel condition at that time is detected and acquired, and a requested torque 46 is acquired (requested torque acquisition step). The process up to this point is identical with that described with reference to FIG. 3. The storage device 44 is searched with the requested torque and the number N of rotations serving as search keys, and a voltage-boosting ratio satisfying the condition and the T-N characteristic corresponding to the voltage boosting ratio are determined (voltage-boosting ratio setting step). For example, when the voltage-boosting ratio of 1.2 is determined, the voltage-boosting ratio of the voltage converter 30 is set to 1.2. By reducing the voltage-boosting ratio, it is possible to reduce the loss as compared with the case of the normal travel, as explained above with reference to FIG. 6.

When a voltage-boosting ratio which is less than 1 is determined, the voltage-boosting ratio is set to 1. In other words, the voltage converter 30 is not operated and the voltage-boosting ratio is set to 1. In this manner, during low-fuel-consumption travel, the voltage-boosting ratio of the power supply device 24 is reduced as compared with that during normal travel, according to the vehicle travel state, so that the loss can be suppressed.

When the voltage-boosting ratio is 1, because the motor/generator 22 is operated with the voltage of the electricity storage device 26, it is desirable that, in a part of the region of a relatively large number N of rotations in which the counter electromotive force is large, a current which cancels the counter electromotive force is supplied. However, if such a current which cancels the counter electromotive force is supplied, a copper loss caused by the current increases. In other words, when the voltage-boosting ratio is reduced, although the loss of the voltage converter 30 can be reduced, the copper loss increases. Therefore, although it is desirable, for reducing the overall loss, to reduce the voltage-boosting ratio of the voltage converter 30 when the increase in the copper loss is small, when the copper loss is increased, in some cases it is desirable to increase the voltage-boosting ratio of the voltage converter 30 to reduce the copper loss.

Figure 8:
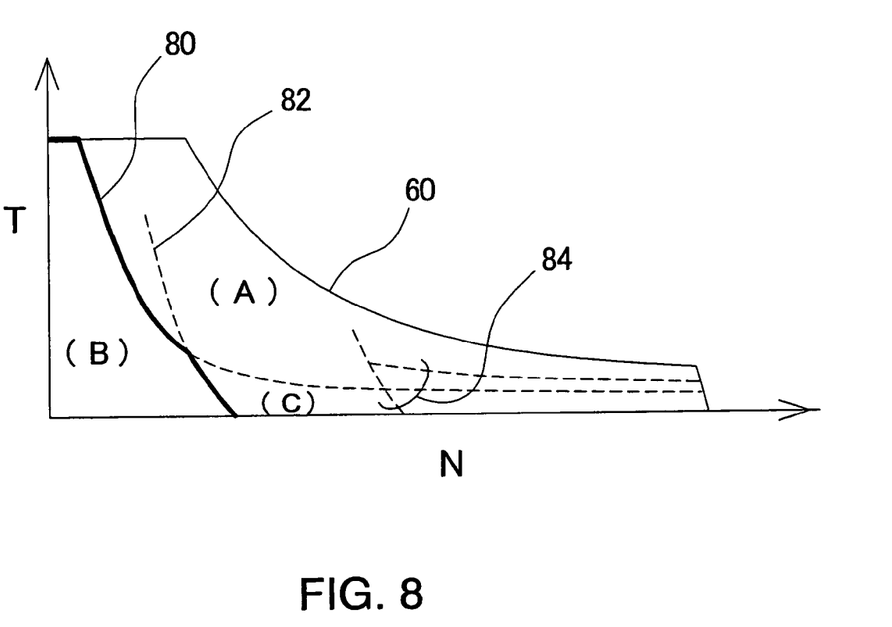
FIG. 8 is a diagram for explaining setting of the voltage-boosting ratio according to a vehicle travel state and on the basis of a copper loss due to a current which cancels a counter electromotive force and a voltage-boosting loss of the power supply device in a preferred embodiment of the present invention.

FIG. 8 shows such a case, and shows a boundary 82 on which the loss of the voltage converter 30 is in balance with the copper loss caused by the current which cancels the counter electromotive force. FIG. 8 shows the low voltage T-N characteristic 80 with voltage-boosting ratio=1. In a region (B) at the left and defined by the low voltage T-N characteristic 80 and the boundary 82; that is, in a region in which the number N of rotations is low, the influence of the reduction of the loss due to the reduction in the voltage-boosting ratio is greater than that of the increase in the copper loss. Therefore, in the region (B), the loss can be reduced with the setting of voltage-boosting ratio=1.

On the other hand, in a region (C) at the right and defined by the low voltage T-N characteristic 80 and the boundary 82; that is, in a region in which the number N or rotations is high, the influence of the increase in the copper loss is greater than that of the reduction of the loss due to the reduction in the voltage-boosting ratio. Therefore, in the region (C), the overall loss can be suppressed more effectively by increasing the voltage-boosting ratio from voltage-boosting ratio=1 to reduce the current for the counter electromotive force accordingly and to reduce the copper loss. In FIG. 8, a characteristic curve 84 shows a configuration in which the voltage-boosting ratio is set slightly higher so that the boundary on which the loss of the voltage converter 30 is in balance with the copper loss is shifted to a side of a higher number of rotations although the T-N characteristic comes near by the T-N characteristic 60 during normal travel because of the increase in the voltage-boosting ratio.

In this manner, it is desirable, when the voltage-boosting ratio of the power supply device is to be reduced during the low-fuel-consumption travel as compared with that during normal travel, to refer to the loss characteristics and to set the voltage-boosting ratio on the basis of the copper loss due to the current which cancels the counter electromotive force and the voltage-boosting loss of the power supply device and according to the vehicle travel state. Such a function is also included in the functions of the loss-reducing module 52.

The invention claimed is:
1. A control device of an electric vehicle, the control device comprising:
    a driving unit having a dynamo-electric machine and a power supply device which is connected to the dynamo-electric machine; and
    a controlling unit which controls the driving unit, wherein the controlling unit comprises:
    a low-fuel-consumption instruction acquisition unit which acquires a low-fuel-consumption travel instruction from a user;
    a storage unit which stores loss characteristics which are a relationship among a torque of the dynamo-electric machine, a number of rotations, and a loss of the driving unit; and
    a loss-reducing unit which refers to the loss characteristics and executes control to reduce the loss of the driving unit according to a requested torque when the low-fuel-consumption travel instruction is acquired.
2. The control device of electric vehicle according to claim 1, wherein
    the loss-reducing unit refers to the loss characteristics and executes a torque limitation on a constant loss characteristic in which the loss of the driving unit is constant, during transition from normal travel to low-fuel-consumption travel.
3. The control device of electric vehicle according to claim 1, wherein
    the loss-reducing unit refers to the loss characteristics and outputs a torque instruction so that the torque is on a constant efficiency characteristic in which efficiency of the driving unit is constant.
4. The control device of electric vehicle according to claim 1, wherein
    the loss-reducing unit refers to the loss characteristics and reduces a voltage-boosting ratio of a power supply device during low-fuel-consumption travel as compared with that during normal travel, according to a vehicle travel state.
5. The control device of electric vehicle according to claim 4, wherein
    the loss characteristics are referred to and the voltage boosting ratio is set based on a copper loss due to a current which cancels a counter electromotive force and a voltage-boosting loss of the power supply device and according to the vehicle travel state.

* * * * *